US008286156B2

(12) United States Patent
Gavens et al.

(10) Patent No.: US 8,286,156 B2
(45) Date of Patent: Oct. 9, 2012

(54) METHODS AND APPARATUS FOR PERFORMING RESILIENT FIRMWARE UPGRADES TO A FUNCTIONING MEMORY

(75) Inventors: Lee Merrill Gavens, Saratoga, CA (US); Charles Michael Schroter, Los Gatos, CA (US); Shing Wong, Sunnyvale, CA (US)

(73) Assignee: SanDisk Technologies Inc., Plano, TX (US)

( * ) Notice: Subject to any disclaimer, the term of this patent is extended or adjusted under 35 U.S.C. 154(b) by 1437 days.

(21) Appl. No.: 11/594,283

(22) Filed: Nov. 7, 2006

(65) Prior Publication Data
US 2008/0109798 A1    May 8, 2008

(51) Int. Cl.
*G06F 9/44* (2006.01)
(52) U.S. Cl. ........................................ 717/169
(58) Field of Classification Search .................. 717/106, 717/168, 169; 713/1; 711/154, 163, 6, 103, 711/202; 714/2; 709/214; 365/200, 230; 361/679.32
See application file for complete search history.

(56) References Cited

U.S. PATENT DOCUMENTS

| 5,600,807 | A | 2/1997 | Itoh et al. |
| 5,826,075 | A | 10/1998 | Bealkowski et al. |
| 6,668,374 | B1 | 12/2003 | Sten et al. |
| 7,003,656 | B2 | 2/2006 | Chheda et al. |
| 7,043,664 | B1 | 5/2006 | Chiloyan |
| 7,082,549 | B2 | 7/2006 | Rao et al. |
| 7,543,118 | B1 * | 6/2009 | Chen et al. ............... 711/154 |
| 7,562,208 | B1 * | 7/2009 | Reed et al. ............... 713/1 |
| 2002/0092008 | A1 | 7/2002 | Kehne et al. |
| 2002/0188886 | A1 | 12/2002 | Liu et al. |
| 2004/0199825 | A1 | 10/2004 | Zeller et al. |
| 2005/0144367 | A1 * | 6/2005 | Sinclair ............... 711/103 |
| 2005/0160217 | A1 * | 7/2005 | Gonzalez et al. .......... 711/6 |
| 2005/0188239 | A1 * | 8/2005 | Golasky et al. .......... 714/2 |
| 2005/0223373 | A1 | 10/2005 | Gage et al. |
| 2006/0070058 | A1 | 3/2006 | Menahemi et al. |
| 2007/0033362 | A1 * | 2/2007 | Sinclair ............... 711/165 |
| 2008/0109647 | A1 | 5/2008 | Gavens et al. |

FOREIGN PATENT DOCUMENTS

TW    5 923 34    6/2004
(Continued)

OTHER PUBLICATIONS

U.S. Appl. No. 11/594,583, filed Nov. 7, 2006, Gavens, et al.
(Continued)

*Primary Examiner* — Tuan Anh Vu
(74) *Attorney, Agent, or Firm* — Weaver Austin Villeneuve & Sampson LLP (57) ABSTRACT

This invention relates generally to methods and computer readable media for upgrading firmware stored in a non-volatile memory, in phases, and restoring firmware in-situ to compensate for failed firmware upgrades. In various embodiments, methods and computer readable media can upgrade and restore the firmware as the non-volatile memory remains functioning. In one embodiment, a method includes designating a first copy of firmware for accessing, and designating a second copy of the firmware for upgrading. The method continues by accessing one or more firmware instructions from the first copy. It also can include upgrading at least a portion of the second copy with at least a portion of new firmware. Upgrading the second copy can be coincident or substantially coincident to accessing the one or more firmware instructions in the first copy.

34 Claims, 7 Drawing Sheets

FOREIGN PATENT DOCUMENTS

| TW | 5 945 71 | 6/2004 |
|---|---|---|
| WO | WO2008/058101 | 5/2008 |

OTHER PUBLICATIONS

Partial Search Report mailed Jul. 10, 2008 in International Application No. PCT/US2007/083704.

International Search Report mailed Nov. 24, 2008 in International Application No. PCT/US2007/083704.

Written Opinion of the International Searching Authority mailed Nov. 24, 2008 in International Application No. PCT/US2007/083704.

Office Action mailed Apr. 29, 2011 in Taiwanese Application No. 096142097.

US Office Action dated Mar. 31, 2011 issued in U.S. Appl. No. 11/594,583.

PCT International Preliminary Report on Patentability and Written Opinion dated May 12, 2009 issued in PCT/US2007/083704.

* cited by examiner

METHODS AND APPARATUS FOR PERFORMING RESILIENT FIRMWARE UPGRADES TO A FUNCTIONING MEMORY

CROSS-REFERENCE TO RELATED APPLICATIONS

This application is related to U.S. patent application Ser. No. 11/594,583 filed on the same day as this application, and entitled "Memory Controllers for Performing Resilient Firmware Upgrades to a Functioning Memory," the disclosure of which is incorporated herein by reference.

BRIEF DESCRIPTION OF THE INVENTION

This invention relates generally to non-volatile memory and removable memory devices, and more particularly, to a method for upgrading firmware stored in a non-volatile memory, in phases, and restoring firmware in-situ to compensate for failed firmware upgrades. In various embodiments, the method can upgrade and restore the firmware as the non-volatile memory remains functioning.

BACKGROUND OF THE INVENTION

Removable memory devices, such as flash memory cards, usually implement a file system for managing directories and files, including system files. System files typically contain firmware (i.e., "flashware") instructions for initializing the flash memory card, and for interfacing a host electronic device with a memory space in a non-volatile memory. Occasionally, firmware instructions are upgraded to correct "bugs" and other deficiencies.

But a common drawback to conventional techniques for upgrading firmware is that a loss of power during the upgrade process could result in data corruption. For example, firmware is frequently corrupted when the flash memory card is disconnected from its power and/or data source while new data is being written to it. Encryption, when used, exacerbates the corruption. Typically, the corruption of the firmware is irreversible, which renders the flash memory card inoperable. The user has little choice but to ship the flash memory card back to the manufacturer (or some third party) to recover its functionality. But a drawback to restoring the firmware at the manufacturer is that the application data stored in the flash memory is usually erased during traditional firmware recovery processes.

Other traditional approaches to upgrading firmware have aimed to reduce the impact of interruptions during the upgrade process. While these other approaches are functional, they appear to be suboptimal in that some approaches upgrade firmware in tandem with memory functionality. As such, these approaches do not sufficiently immunize the user and/or the functionality of the non-volatile memory (and its application) from power disruptions during firmware upgrades and data recovery mechanisms.

It would be desirable to provide improved techniques and structures that minimize one or more of the drawbacks associated with conventional techniques for upgrading non-volatile memory and recovering firmware, for example, in a removable memory device.

SUMMARY OF THE INVENTION

This invention relates generally to methods and computer readable media for upgrading firmware stored in a non-volatile memory, in phases, and restoring firmware in-situ to compensate for failed firmware upgrades. In various embodiments, methods and computer readable media can upgrade and restore the firmware as the non-volatile memory remains functioning. In one embodiment, a method includes designating a first copy of firmware for accessing, and designating a second copy of the firmware for upgrading. The method continues by accessing one or more firmware instructions from the first copy. It also can include upgrading at least a portion of the second copy with at least a portion of new firmware. Upgrading the second copy can be coincident or substantially coincident to accessing the one or more firmware instructions in the first copy.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
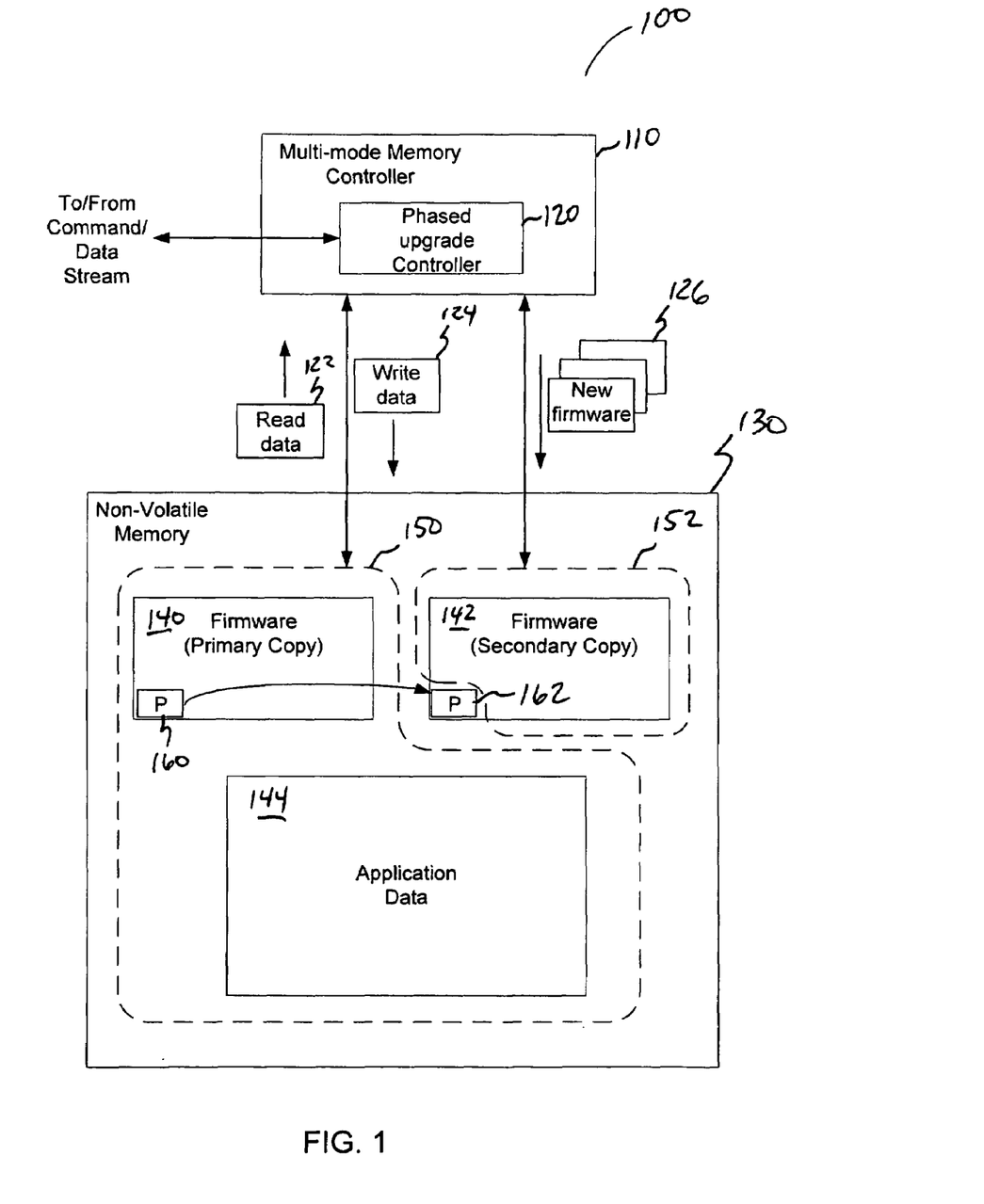
FIG. 1 is a block diagram of an apparatus for upgrading firmware stored in a non-volatile memory, in phases, as the non-volatile memory remains functioning, according to at least one embodiment of the invention.

FIG. 1 is a block diagram of an apparatus for upgrading firmware stored in a non-volatile memory, in phases, as a non-volatile memory remains functioning, according to at least one embodiment of the invention. In the example shown, apparatus 100 includes a multi-mode memory controller 110, a phased upgrade controller 120 and a non-volatile memory 130, which includes memory locations for a first copy ("primary copy") 140 of firmware, a second copy ("secondary copy") 142 of firmware, and application data 144 stored for an electronic device (not shown). Multi-mode memory controller 110 is configured to implement an upgrade mode for upgrading firmware in non-volatile memory 130 coincident to, or substantially coincident to, a functional mode during which non-volatile memory 130 functions as a memory store. For example, multi-mode memory controller 110—in whole or in part—can be configured to read data 122 from, and write data 124 to, first copy 140 and/or application data 144 during the functional mode, while multi-mode memory controller 110 replaces at least a portion of second copy 142 with upgraded firmware ("new firmware") 126 during the upgrade mode. Thus, non-volatile memory 130 can have a portion 150 of its memory locations functioning as storage in parallel with firmware upgrades to other memory locations in another portion 152. In some embodiments, concurrent upgrade and functional modes serve to shield the functionality of non-volatile memory 130 (along with its application) from inefficiencies in performing firmware upgrades in series with implementing non-volatile memory 130 as a memory store.

In another embodiment, multi-mode memory controller 110 can operate first copy 140 of firmware and application data 144 as a memory store in the functional mode, while restoring the firmware in second copy 142 during a recovery mode. In some embodiments, concurrent functional and recovery modes serve to isolate the functionality of non-volatile memory 130 from an interruption, such as a power disruption, during the upgrading of firmware. In one embodiment, multi-mode memory controller 110 can be configured to recover firmware in-situ, without removing non-volatile memory 130 from its implementation in apparatus 100 or with an electronic host device (not shown).

Phased upgrade controller 120—in whole or in part—can be configured to guide an upgrade mode of operation through a progression of states. Should a disruptive event halt the upgrade mode, phased upgrade controller 120 can continue upgrading the firmware by progressing through a remaining number of states of the upgrade mode. For example, phased upgrade controller 120 can detect a state in which a disruptive event halted a previous upgrade mode, and then resume the firmware upgrade at or near the state at which the disruptive event occurred. As such, phased upgrade controller 120 can omit previously completed states to preserve computational resources of multi-mode memory controller 110 that otherwise would be consumed in repeating states that were successfully completed in the previous upgrade mode.

Phased upgrade controller 120 can be further configured to merge at least one portion of the original firmware from either first firmware copy 140 or second firmware copy 142 with upgraded firmware 126 to form at least a portion of an upgraded copy in second copy 142 of firmware. In one embodiment, phased upgrade controller 120 is configured to copy a portion ("P") 160 of firmware to another portion ("P") 162 of firmware. As such, phased upgrade controller 120 can reuse old firmware (or portions thereof) to preserve it through multiple upgrade modes. An example of firmware and/or system files that should be preserved is parametric data (e.g., clock trim values) that are initially programmed by the manufacturer and cannot readily be determined independent from the original firmware.

As used herein, the term "multi-mode," at least in one embodiment, refers to a characteristic of a memory controller or a process that can perform non-volatile memory operations in multiple modes simultaneously or nearly simultaneously. For example, a multi-mode memory controller can implement two or more of the following substantially in parallel: a functional memory mode, an upgrade mode and a recovery mode. As used herein, the term "phased upgrade," at least in one embodiment, refers to any controller or mode that facilitates firmware upgrades in phases. The term "phase," at least in some embodiments, can be used interchangeably with the term "state." In one embodiment, a single state can form an entire copy of upgraded firmware, with other states reserved for validating the new firmware, and other like operations. As used herein, the term "disruptive event," at least in one embodiment, refers to either an unintentional or intentional interruption to a firmware upgrade process. Examples of unintentional disruptive events include power losses, transient-related errors that corrupt data integrity, and the like. Examples of intentional disruptive events include power cycling (e.g., turning power off and on), resetting and/or rebooting a memory controller, and the like.

As used herein, the term "functional mode," at least in one embodiment, refers to an ability of a non-volatile memory to perform a function (e.g., a data storage function) for which the memory is implemented. During a functional mode, a memory controller, for example, can access firmware and/or application data to facilitate the functionality of the memory. For example, apparatus 100 can execute one or more instructions as well as access data stored in either first copy 140 or application data 144 during a functional mode. As used herein, the term "upgrade mode," at least in one embodiment, refers to an ability of a non-volatile memory to update executable firmware instructions that provide enhancements over an earlier version. According to various embodiments, a non-volatile memory can be selectably upgraded. For example, current executable firmware instructions can be merged with new executable firmware instructions to form upgraded firmware. In various embodiments, an upgrade mode is performed in phases, or in a number of states, such that a memory controller can resume a firmware upgrade at a state at which a disruptive event had occurred, thereby omitting at least one state that preceded the disruptive event. As used herein, the term "recovery mode," at least in one embodiment, refers to an ability of a non-volatile memory to restore firmware to a fail-tolerant state, such as by recovering a redundant copy of firmware subsequent to an aborted upgrade mode. In various embodiments, a recovery mode is implemented as an "in-situ" recovery mode, whereby a memory controller can restore firmware in a non-volatile memory to obtain fail-safe operation during operation in conjunction with a host device, as an example. Note that in some embodiments, the upgrade mode and the recovery mode generally occur "in the background," such that the functionality of non-volatile memory can continue unimpeded, or substantially so. In some cases, the functional mode can take precedence over either the upgrading or recovering firmware.

In one or more embodiments, first copy ("primary copy") 140 of firmware is used to provide functionality to non-volatile memory 130, whereas second copy ("secondary copy") 142 of firmware is used as a redundant firmware that serves as a back-up copy of firmware should first copy 140 become corrupt or otherwise unusable. As such, first copy 140 and second copy 142 generally include the same firmware data and/or instructions in modes other than the upgrade mode. Note that either first copy 140 of firmware or second copy 142 of firmware can be the initial copy subject for a firmware upgrade, with the other copy being upgraded subsequently. As used herein, the term "firmware," at least in one embodiment, refers to executable instructions and/or data used to facility functionality of a removable memory card and/or non-volatile memory as a data store. In some cases, firmware can be used to implement system files. Note that the one or more of the elements described in FIG. 1 (as well as the elements described subsequent to FIG. 1) can be implemented in either software (firmware) or hardware, or both. Note, too, that the elements and their functionality described in FIG. 1 (and in other figures) can be aggregated with one or more other elements, or, alternatively, the elements and their functionality can be subdivided into constituent sub-elements, if any.

Figure 2:
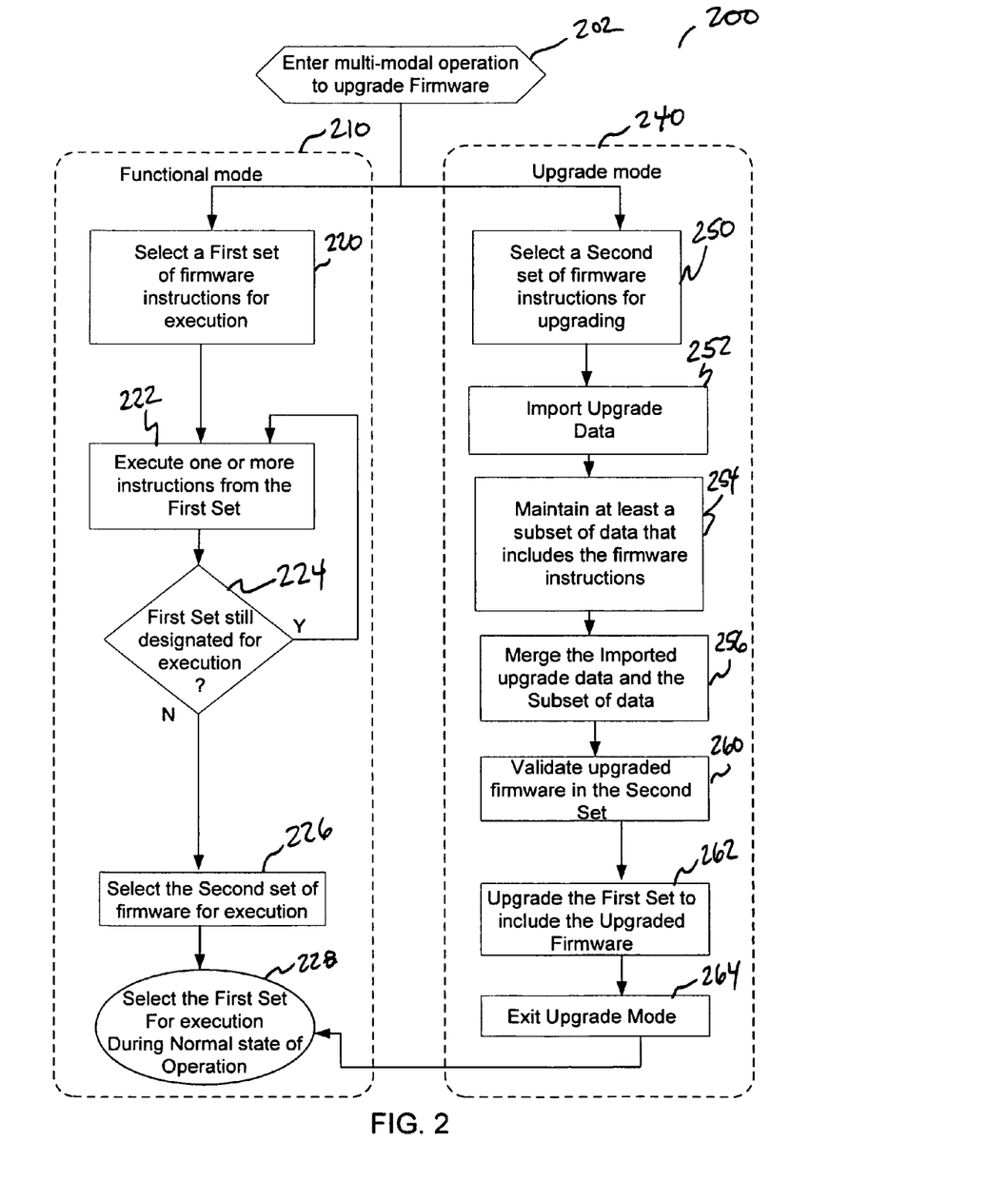
FIG. 2 is a flow diagram depicting one example of a method for facilitating the functionality of non-volatile memory during firmware upgrades, according to one embodiment of the invention.

FIG. 2 is a flow diagram depicting one example of a method for facilitating the functionality of non-volatile memory during firmware upgrades, according to one embodiment of the invention. As shown, flow 200 begins at 202, at which a memory controller, for example, can operate multiple modes of operation in parallel. As such, flow 200 includes two parallel flows: a sub-flow 210 depicting a functional mode and a sub-flow 240 depicting an upgrade mode. Sub-flow 210 and sub-flow 240 begin by respectively selecting a first set of firmware instructions (or memory locations) for execution at 220, such as those instructions and/or data in a primary firmware copy, and a second set of firmware instructions (or memory locations) for upgrading at 250, such as those instructions and/or data in a secondary firmware copy. Sub-flow 210 continues to 222 at which a multi-mode memory controller, for example, executes one or more instructions from the first set of firmware instructions. Note that in some embodiments, the multi-mode memory controller can also execute instructions from memory locations containing applications data in a user address space. Further, the controller can write and/or read data from those memory locations of either the user address space or the first firmware copy. Sub-flow 210 continues to access the first set of firmware instructions during the functional mode so long as, for example, a phased upgrade controller designates the first set for execution at 224.

Sub-flow 240 continues in parallel, or substantially in parallel, to the execution of the first set of firmware instructions to upgrade the second set of firmware instructions. In particular, sub-flow 240 imports upgrade data at 252 from, for example, a host electronic device that is configured to obtain new firmware, and maintains at least some of the original firmware instructions and/or data at 254. At 256, sub-flow 240 merges the imported upgrade data (i.e., portions of the new firmware) with the current firmware (i.e., portions of the old firmware) to form an upgrade copy of firmware as the second set of firmware instructions. Next, sub-flow 240 validates the upgrade firmware at 260 to confirm that the firmware upgrade has been successful.

If successful, a multi-mode memory controller swaps designations for the first and second sets of firmware instructions. In particular, the second set is selected for execution at 226 for participation in sub-flow 210, and the first set is selected for upgrading at 262 in sub-flow 240. After the first set is successfully upgraded, sub-flow 240 terminates at 264 and sub-flow 210 selects the upgraded first set—as a primary copy—for execution at 228 for a normal state of operation. As such, the upgraded second set is available as a redundant, "secondary copy" to ensure fail-safe operation.

Figure 3:
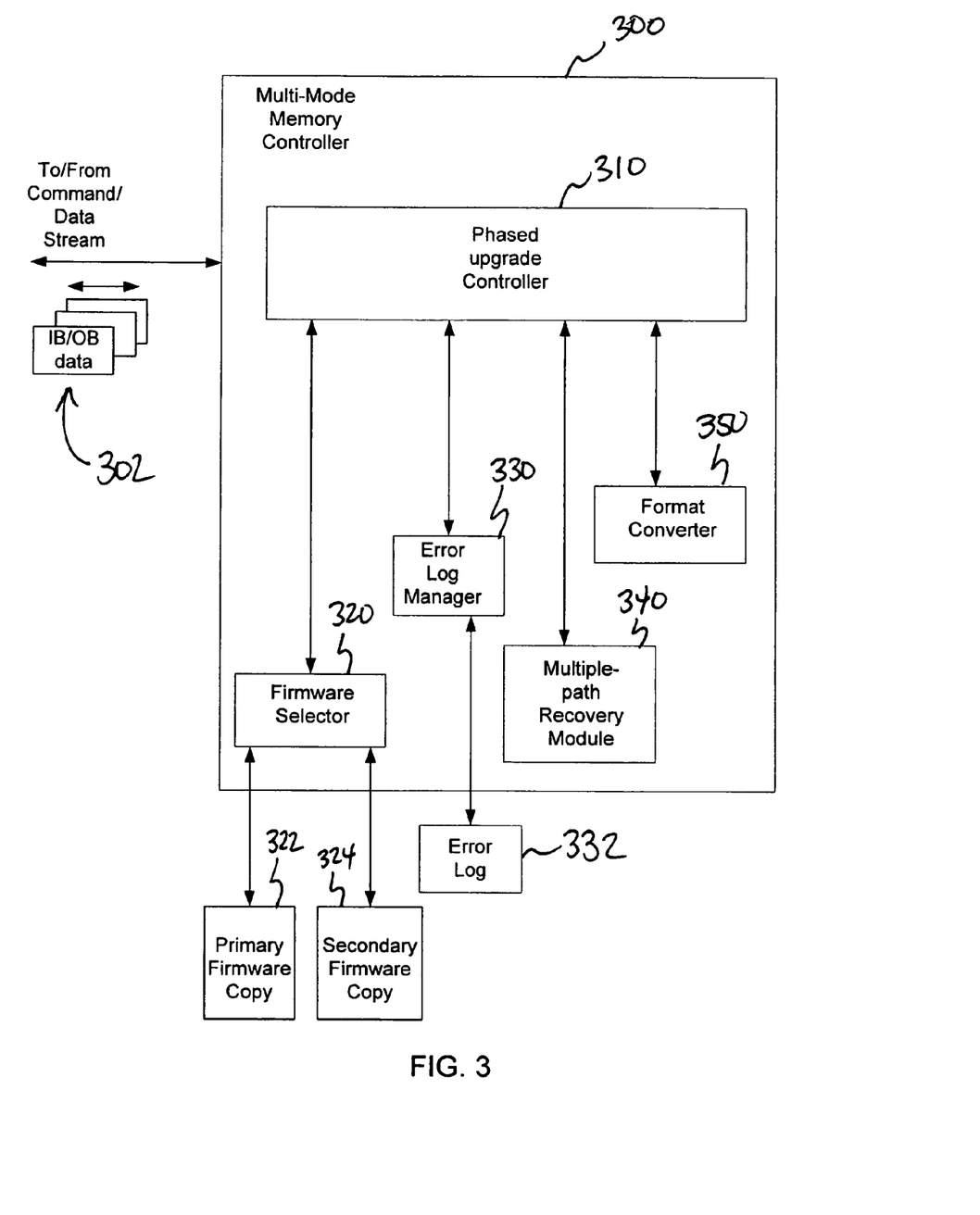
FIG. 3 is a block diagram of a multi-mode memory controller for upgrading firmware in phases, according to at least one embodiment of the invention.

FIG. 3 is a block diagram of a multi-mode memory controller for upgrading firmware in phases, according to at least one embodiment of the invention. In the example shown, a multi-mode memory controller 300 can include a phased upgrade controller 310 and one or more of the following: a firmware selector 320, an error log manager 330, a multiple-path recovery module 340, and a format converter 350. Multi-mode memory controller 300 is configured to exchange inbound/outbound ("IB/OB") data 302 via a command/data stream with, for example, a host (not shown). Inbound/outbound data 302 can include commands, instructions, and data, which include application data. During an upgrade mode, the host can send inbound/outbound data 302 as host commands to multi-mode memory controller 300 for initiating and completing the upgrade mode, according to one embodiment. The host can also send new firmware as inbound/outbound data 302 for writing into a non-volatile memory (not shown). Inbound/outbound data 302 can also include application data (e.g., image data for a digital camera application) that is to be written into or read from the non-volatile memory, or, alternatively, inbound/outbound data 302 can include instructions for execution by either a processor (not shown) in the host or by multi-mode memory controller 300.

Firmware selector 320 is configured to select one of two copies of firmware for upgrading in an upgrade mode, and to select the other copy of the firmware for accessing during a functional mode. Phased upgrade controller 310 and firmware selector 320 cooperate to select memory locations of primary firmware copy 322 and secondary firmware copy 324 as a function of a state of the upgrade mode. In some cases, primary firmware copy 322 operates according to a functional mode and secondary firmware copy 324 operates according to an upgrade mode, or vice versa. According to one embodiment, firmware selector 320 is configured to select one of any number of copies of firmware for upgrading and at least one other copy from the remaining number of copies for supporting a functional mode. Firmware selector 320 can copy portions of firmware from any firmware copy to any firmware copy. In some embodiments, firmware selector 320 can also perform a multiplexer-like function in that it can route instructions and/or application data between the host and primary firmware copy 322 during a functional mode, and it can route write data as new firmware to secondary firmware copy 324 in an upgrade mode. Note that firmware selector 320 can route data to and from both copies 322 and 324 simultaneously, or nearly simultaneously, regardless of their specific modes of operation.

Phased upgrade controller 310 is configured to identify a state of the firmware upgrade in which a disruptive event occurred in a previously performed upgrade process, and to resume the firmware upgrade where it left off. An error log 332 is configured as a repository to store state information, including an indicator of the state. As used herein, the term "error log," at least in one embodiment, refers to a repository for storing state information. State information can include, for example, identifiers that indicate the last successfully completed phase of an upgrade mode so that a memory controller can resiliently continue the upgrade mode should there be an intervening disruptive event. In some embodiments, the error log can be stored in a specific block in flash memory or in a separate memory.

An error log manager 330 is configured to store and/or retrieve state information for phased upgrade controller 310. In operation, error log manager 330 stores an indicator representing a present state (or phase) of the upgrade mode when a firmware copy is being upgraded. Accordingly, if the upgrade processes is interrupted by a disruptive event, phased upgrade controller 310 can detect the last state (or phase) that was successfully completed before the disruptive event intervened. Then, the upgrade process can continue without repeating successfully completed states. In one embodiment, error log manager 330 conveys the state information from error log 332 to phased upgrade controller 310 during the booting-up of multi-mode memory controller 300, which, in turn, determines a course of action as a function of the stored state information. For example, phased upgrade controller 310 and error log manager 330 can cooperate to determine that a firmware upgrade is associated with a state indicative of either a complete (e.g., successful) firmware upgrade or an incomplete (e.g., unsuccessful) firmware upgrade.

Multiple-path recovery module 340 is configured to perform in-situ recovery, in whole or in part, in association with a set of locations of a firmware copy (e.g., secondary firmware copy 324) in response to a disruptive event. In some embodiments, the firmware copy undergoing an upgrade is a redundant copy of firmware. During the upgrade mode, the redundant copy is erased in preparation for being written with new and old firmware to form an upgraded copy of firmware. The disruptive event interrupts the upgrade process, thereby leaving one known good firmware copy from which to reboot. But a single copy can fail to provide sufficient fault tolerance in some cases. Consequently, multiple-path recovery module 340 is configured to restore firmware to a fail-tolerant state, such as by recovering the redundant copy of firmware. Notably, multiple-path recovery module 340 can perform firmware recovery substantially in parallel to the execution of firmware instructions in another firmware copy.

In various embodiments of the invention, multiple-path recovery module 340 implements at least two paths (i.e., multiple paths) to firmware recovery, the selection of a path being a function of a state of the upgrade process. If multiple-path recovery module 340 determines that a state is associated with a first subset of states, then a first path to recovery is taken, whereas if the state is associated with a second subset of states, then a second path to recovery is taken. A disruptive event occurring in a state from either the first subset or second subset can result in storing a state indicative of an incomplete firmware upgrade. To illustrate, consider the following example in which the first subset of states includes both an "only old" state and a "try new" state, whereas the second subset of states includes an "only new" state. During the "only old" and "try new" states, secondary firmware copy 324 is erased in preparation for writing an upgrade to the firmware. If a disruptive event occurs during those states, secondary firmware copy 324 is unavailable for redundancy purposes. As such, multiple-path recovery module 340 takes the first path and recovers the firmware in secondary firmware copy 324 by copying primary firmware copy 322 into memory locations for secondary firmware copy 324. Similarly, during the "only new" state, primary firmware copy 322 is erased in preparation for writing an upgrade to the firmware. If a disruptive event occurs during that state, primary firmware copy 322 is unavailable for redundancy purposes. Consequently, multiple-path recovery module 340 takes the second path and recovers the firmware in primary firmware copy 322 by copying secondary firmware copy 324 into memory locations for primary firmware copy 322.

Format converter 350 can be configured to convert data representing at least a portion of firmware from an old file map format to a new file map format. A "file map" is file that provides a mapping between files and locations (or sectors) in a non-volatile memory, including flash memory. For each file, the file map includes a file name (i.e., file ID), the size of the file, the location, and other data for locating the file. But if file map is modified to, for example, express a different way to locate a file, then the old firmware files in an old file map format should be converted to a new file map format. To illustrate, consider the case in which old firmware is merged with new firmware to form an upgraded firmware copy. Consider that the new firmware includes a new file map format. First, the firmware having an old file map format is copied out of, for example, primary firmware copy 322. Next, format converter 350 converts the firmware having the old file map format into the same firmware having the new file map format. Then, the old firmware in the new file map format is merged with the new firmware, thereby forming an upgraded firmware copy in a new file map format, for example, in secondary firmware copy 324.

Figure 4:
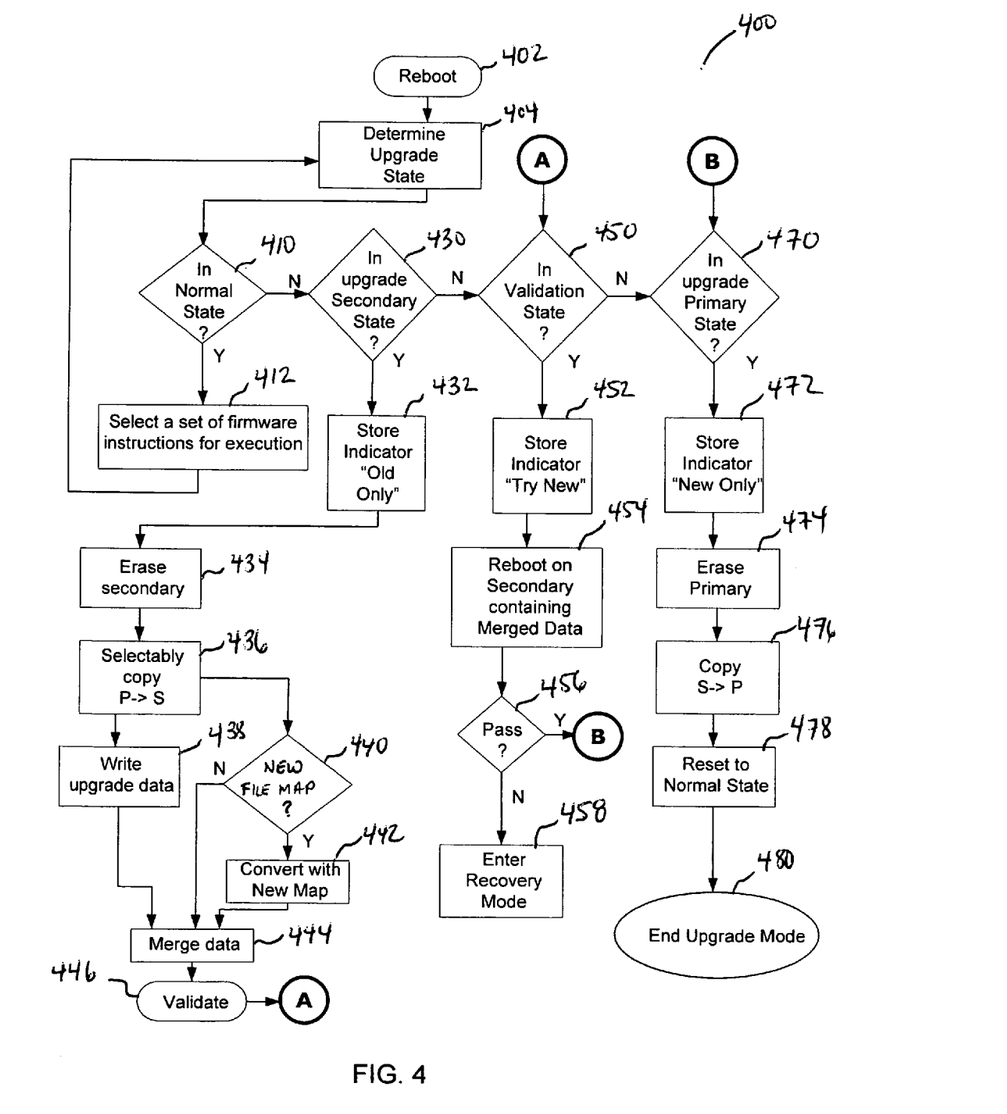
FIG. 4 is a flow diagram depicting an example of a method for facilitating the functionality of non-volatile memory during firmware upgrades, according to one embodiment of the invention.

FIG. 4 is a flow diagram depicting an example of a method for facilitating the functionality of non-volatile memory during firmware upgrades, according to one embodiment of the invention. In the example shown, flow 400 begins at 402, at which a memory controller, for example, can operate to reboot from a disruptive event, regardless of whether a prior firmware upgrade was intentionally or unintentionally interrupted. During the reboot, the memory controller can determine the upgrade state at 404, for example, by accessing an error log to determine whether the non-volatile memory is in a normal state at 410, an upgrade secondary state at 430, a validation state at 450, or an upgrade primary state at 470. If the memory controller is rebooting subsequent to a normal state of operation, then the memory controller will continue to execute a set of firmware instructions and/or data from, for example, a primary firmware copy at 412.

Next, consider that an upgrade mode has begun. In this case, the memory controller enters into an "upgrade secondary state" at 430 by storing an indicator "old only" as the state at 432. The "old only" state indicates the old firmware (e.g., the primary firmware copy) is available from which to boot since the redundant copy (e.g., the secondary firmware copy) will be erased at 434. Then, the memory controller selectably copies portions of the old firmware from the primary ("P") into the secondary ("S") firmware locations at 436. If a new file map exists at 440 for the new firmware, then the portions of the old firmware are converted into the new file map format at 442. New firmware is written as upgrade data into other portions of the secondary firmware locations at 438. The new and old firmware are merged together at 444 to form a copy of upgraded firmware. Next, the upgraded firmware is validated at 446 to determine whether the firmware had been successfully upgraded. Note that if the memory controller determines that the error log contains an indicator representing an "upgrade secondary state" upon reboot, then the memory controller had previously begun an upgrade mode that was likely interrupted during this state. According to one embodiment, the memory controller can enter a recovery mode to restore the second firmware copy. In another embodiment, the above-described actions relating to the "old only" can be repeated until the "try new" state is reached, thereby continuing onward to complete the upgrade mode, albeit without redundancy.

Flow 400 continues at 450. If the memory controller determines that it is entering a validation state 450, then it stores an indicator "try new" as the state at 452. The "try new" state indicates that the upgrade firmware has been successfully written into the secondary firmware copy. Next, the memory controller reboots using the upgraded firmware (i.e., the upgraded secondary firmware copy) to validate the upgraded firmware at 454. If the firmware upgrade does not pass at 456, then the memory controller enters a recovery mode 458 to replace the invalid upgraded firmware with a copy of the primary firmware copy. Note that if the memory controller determines that the error log contains an indicator representing a "validation state" upon reboot, then the memory controller had previously begun an upgrade mode that might have been interrupted during this state, thereby leaving the upgraded firmware yet to be validated. According to one embodiment, the memory controller can enter recovery mode 458 to restore the second firmware copy if a disruptive event occurs. In another embodiment, the above-described actions relating to the "try new" can be repeated until the "new only" state is reached, thereby continuing onward to complete the upgrade mode.

If the firmware upgrade passes the validation at 456, then flow 400 continues at 470, where the primary firmware copy undergoes an upgrade. If the memory controller determines that it is entering an "upgrade primary state" at 470, then it stores an indicator "new only" as the state at 472. The "new only" state indicates that the firmware upgrade has been successful for the secondary firmware copy, and that the primary firmware copy is to be upgraded next. But until the primary firmware copy is successfully upgraded, the new firmware is available from which to boot as the primary firmware copy is erased at 474. Then, the memory controller copies the upgraded secondary firmware copy into the primary firmware copy at 476. At 478, both firmware copies have been upgraded and the error log is reset to a normal state, thereby concluding the upgrade mode at 480. Note that if the memory controller determines that the error log contains an indicator representing an "upgrade primary state" upon reboot, then the memory controller had previously begun an upgrade mode that might have been interrupted during this state. As such, the memory can take courses of actions as similarly described with respect to the other states. In other embodiments, any of a multiple number of firmware copies that include one or more current firmware copies and one or more new firmware copies can be used during the "old only" state and the "new only" state, respectively.

Figure 5:
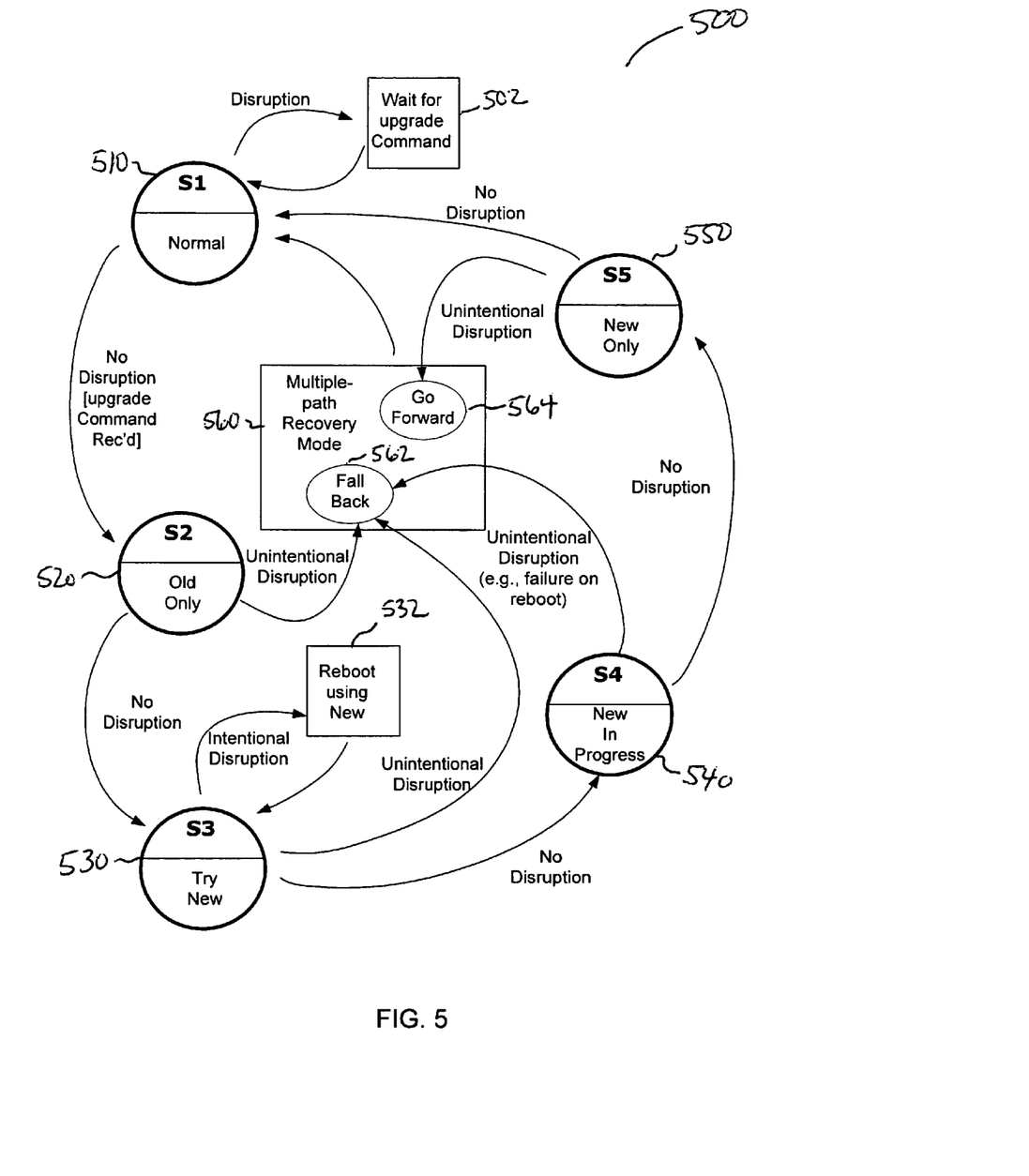
FIG. 5 is a state diagram depicting the states of an upgrade mode during which firmware can be recovered as a function of the states, according to one embodiment of the invention.

FIG. 5 is a state diagram depicting the states of an upgrade mode during which firmware can be recovered as a function of the states, according to one embodiment of the invention. A memory controller, for example, can perform firmware upgrades to a flash memory in accordance with state diagram 500. In the example shown, the memory controller initially operates in a normal state ("S1") at 510. It awaits an upgrade command at 502, from a host electronic device (not shown). If there is a disruption (i.e., a disruptive event), unintentional or otherwise, the memory controller keeps waiting for the upgrade command. Once it receives that command, the error log manager stores a state identifier (e.g., "S2") in the error log to indicate that the "old only" state at 520 is underway. In this state, the target firmware (e.g., the secondary firmware copy) is erased and is replaced with an upgraded copy of firmware. Should an unintentional disruptive event occur (e.g., a loss of power) during this state, the memory controller can boot up using the "old only" (i.e., current firmware from one or more copies) to enter a multiple-path recovery mode of operation at 560. In particular, the memory controller takes a first path to recovery ("fall back") at 562 to write the primary firmware copy into the erased locations of the secondary firmware copy, thereby restoring redundancy. Note that the recovery can occur in parallel to the memory controller operating in a normal state at 510 (i.e., in a functional mode).

If there is no disruption at 520, then the memory controller continues to the next state of the upgrade mode, which is the "try new" state ("S3") at 530 during which the error log manager stores the state identifier. In this state, the new firmware has been successfully written into the memory locations of the second firmware copy. But the upgraded firmware has not yet been validated to confirm its operability. Should an unintentional disruptive event occur (e.g., a loss of power) during this state, the memory controller cannot yet boot up using the new firmware as it has yet to be validated. As such, the memory controller takes the first path to recovery ("fall back") at 562 to restore a redundant copy for fault-tolerant operation. But if no unintentional disruption occurs during the upgrade mode of operation, then the memory controller will continue the upgrade process by resetting itself or by interrupting the power supply (i.e., perform a power cycle) to use the upgraded firmware at 532 upon reboot for validating the upgrade. In one embodiment, the upgraded firmware is validated when the memory controller executes the upgraded firmware and moves to the next state, indicating that the upgraded firmware is operable. In other embodiments, the upgraded firmware is validated by comparing error correction codes ("ECCs") as well as using other error detection techniques known in the art.

If there is no disruption at 530, then the memory controller continues to the next state of the upgrade mode, which is the "new in progress" state ("S4") at 540 during which validation takes place for the new firmware. In one embodiment, the error log manager stores the state identifier in the error log when the memory controller boots up to, for example, avoid rebooting into an infinite loop of perpetually using the new firmware for validation purposes. In some embodiments, the memory controller equates a faulty firmware upgrade as an unintentional disruptive event. So, if firmware upgrade is invalidated during this state (or if an unintentional disruptive event occurs), the memory controller again takes the first path to recovery ("fall back") at 562 to restore a redundant copy with a known good copy of firmware (i.e., the primary copy). But if the memory controller is up and running to validate a successful firmware upgrade, the memory controller enters a next state of operation, which is the "new only" ("S5") state at 550. This state is written into the error log. And in this state, the primary copy of firmware is erased in preparation for receiving an upgraded copy of firmware.

If there is a disruptive event during state 550, then unlike the previous states, the memory controller does not enter multiple-path recovery mode at 560 using the primary firmware copy. As such, the memory controller takes the second path to recovery ("go forward") at 564 to restore the primary copy with a redundant copy. Note that if the firmware upgrade of the primary copy is faulty at 550, then the memory controller can also take the second path to recovery. In one embodiment, the memory controller can optionally reboot using the new firmware in the primary copy to validate the new firmware. If the firmware upgrade to the primary copy is invalidated, then the memory controller can again take the second path of recovery at 564. But if there are no disruptions, the primary copy is again designated as the "primary" copy for any subsequent rebooting operations, and the memory controller exits the upgrade mode to enter the normal state at 510. Note that in alternate embodiments, a state indicator can be stored either at the beginning, the end, or any time during a state. In some embodiments, the "old only" state can be referred to as the "use old" state, the "try new" state can be referred to as the "installing new" state, the "new in progress" state can be referred to as the "validation" state, and the "new only" state can be referred to as the "use new" state. In some embodiments, the terms "use old" and "use new" are not limited to only old and only new, respectively.

Figure 6:
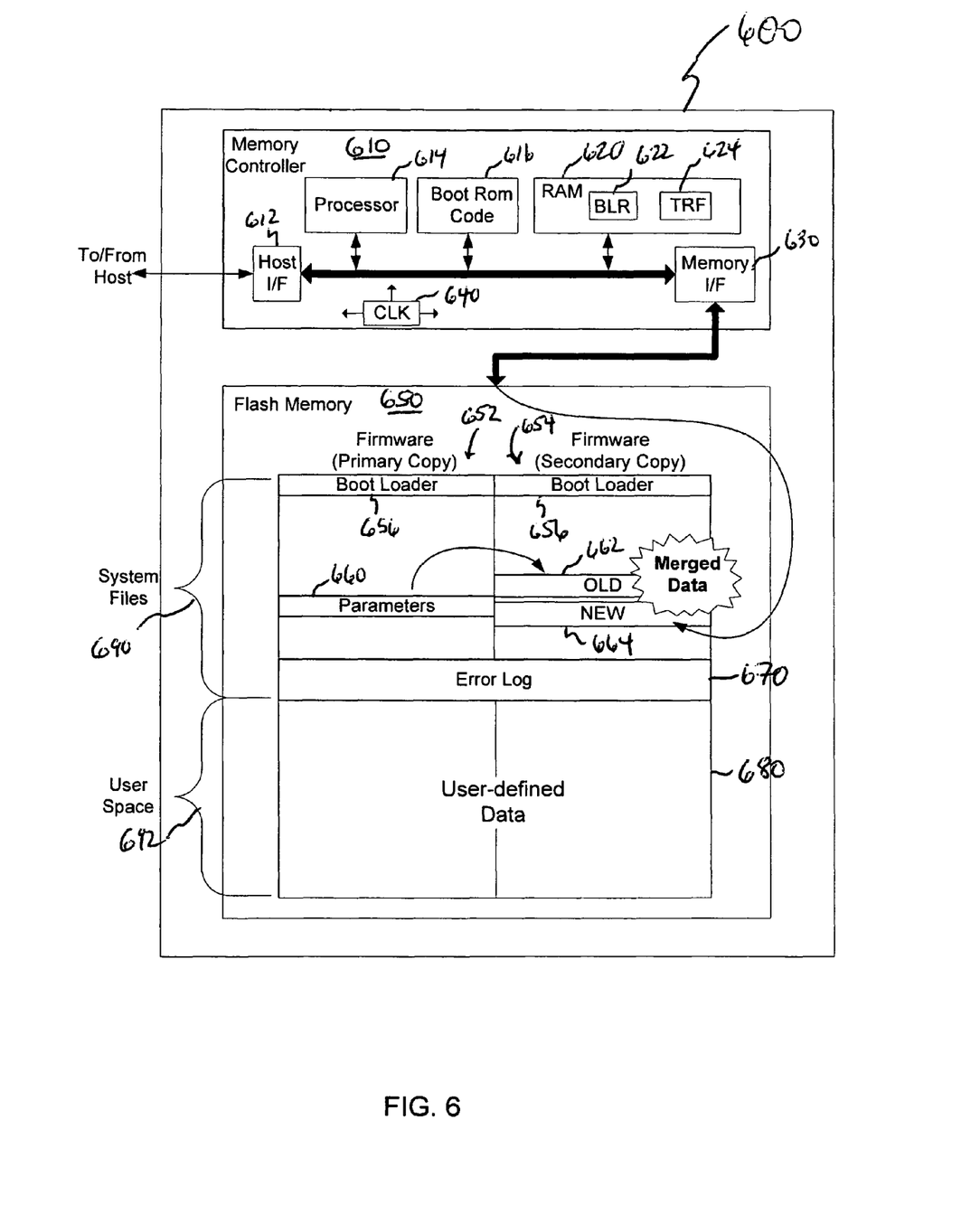
FIG. 6 is a block diagram of a removable memory device that provides for phased firmware upgrades, according to at least one embodiment of the invention.

FIG. 6 is a block diagram of a removable memory device that provides for phased firmware upgrades, according to at least one embodiment of the invention. In the example shown, removable memory device 600 is a flash memory card that includes a memory controller 610 and a flash memory 650. Memory controller 610 includes a processor 614 that provides much of the functionality of the flash memory card, as well as some aspects of the various embodiments of the invention. Processor 614 can also perform wear-leveling and error correction for flash memory 650. Memory controller 610 also includes a non-volatile memory ("boot ROM code") 616 for storing a boot ROM code and another memory (e.g., "RAM") 620 for storing a boot loader code. The code stored in memories 616 and 620 can collectively constitute initialization instructions. In one embodiment, processor 614 executes code in memory 616 to load boot loader code ("boot loader") 656 from either primary copy 652 or secondary copy 654 to a boot loader memory space ("BLR") 622 in memory 620. In one embodiment, processor 614 is configured to execute the boot ROM code from memory 616 to determine which firmware copy is designated for modifying its system files. It is at or near the execution of the boot ROM code (i.e., the boot-up mode) that processor 614 accesses an error log 670 to determine the state of an upgrade mode operation, and, thus determines whether to boot-up using system files 690 from either primary firmware copy 652 or secondary firmware copy 654. Once memory controller 610 and removable memory card 600 are initialized, a host (not shown) can use the memory locations in a user space 692 for accessing user-defined data 680.

Memory controller 610 also includes: a host interface ("I/F") 612 for exchanging data and commands with a host, a memory interface ("I/F") 630 for accessing files stored in a number of sectors of flash memory 650, a transfer buffer ("TRF") 624 for temporarily storing, for example, new firmware that is sent down from host for upgrading a copy of firmware, and a clock ("clk") 640 for controlling the timing of the elements in memory controller 610. Note that the behavior of clock 640 is governed, at least in part, by clock trim values stored as parameters 660 in flash memory 650. These values should survive a modification of system files 690 in either primary copy 652 or secondary copy 654. In particular, a parameters file 660 is an example of data in "old firmware" that is copied, converted into a new file map format (optional), and then merged as old firmware 662 with new firmware 664 to form the merged data of an upgraded copy of firmware. Note that in at least one embodiment, system files 690 include a phased upgrade controller module, an error log manager module, a firmware selector module, a multi-path recovery module, and a format converter module, each of which can include executable instructions that, when executed by processor 614, performs the various functions described herein. In other embodiments, these modules can be implemented in hardware (e.g., circuitry) or software, or the combination thereof. Note, too, that the boot ROM code in memory 616 and boot loader code in boot loader memory space 622 can reside in one or more memories.

Figure 7:
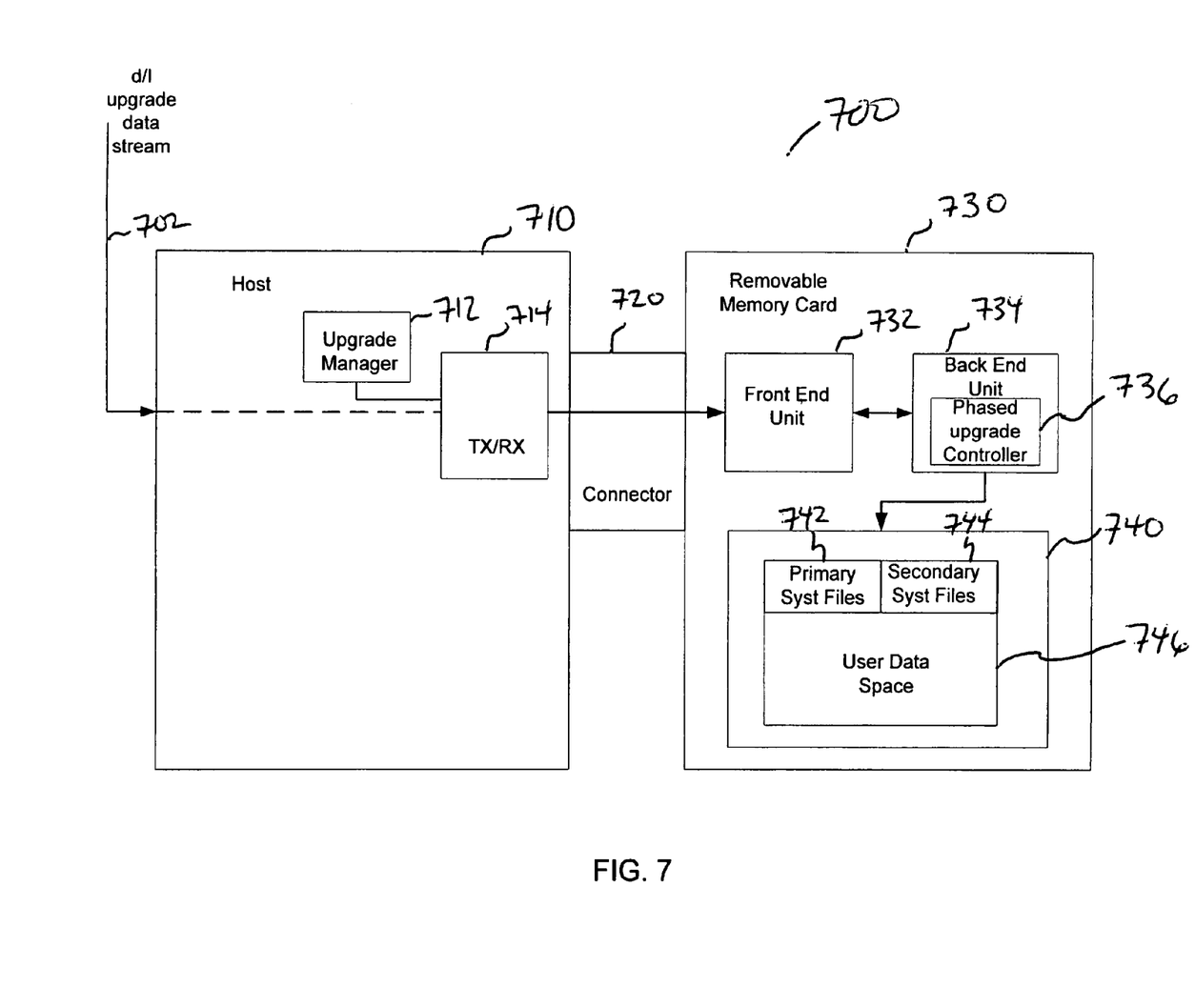
FIG. 7 is a block diagram of a system including a host and a removable memory card for performing phased firmware upgrades in multiple modes of operation, according to at least one embodiment of the invention.

FIG. 7 is a block diagram of a system including a host and a removable memory card for performing phased firmware upgrades in multiple modes of operation, according to at least one embodiment of the invention. In the example shown, host 710 can be any electronic device capable of using removable memory card 730 as storage and receiving a downloaded ("d/l") upgrade data stream 702 from a remote source, which can be the manufacturer of the removable memory card 730. As shown, host 710 is electrically coupled to removable memory card 730 via a connector 720. Host 710 includes an upgrade manager 712 and a transceiver ("TX/RX") 714. Removable memory card 730 includes a front end unit 732 configured to, among other things, decrypt the data and command streams from host 710, and a back end unit 734 including a phased upgrade controller 736. Back end unit 734 operates as a multi-mode memory controller in some embodiments. As such, back end unit 734 can access flash memory 740 and its constituent elements that include primary system files ("syst files") 742, secondary system files ("syst files") 744, and user data space 746.

In operation, upgrade manager 712 is configured to issue commands and relay new firmware (from upgrade data stream 702) via transceiver 714 to removable memory card 730. In operation, upgrade manager 712 can issue a command to phased upgrade controller 736, for example, to initiate a phased firmware upgrade. Also, upgrade manager 712 can issue another command to conclude the phased firmware upgrade. Transceiver ("TX/RX") 714 operates to send commands and new firmware to removable memory card 730 during an upgrade mode, and operates further to provide host 710 access to user data space 746 during a functional mode. In various embodiments, either host 710 or removable memory card 730, or both, can each operate concurrently in a functional mode and an upgrade mode, for example.

In one embodiment, removable memory card 730 can be a flash memory card of any kind using any type of flash memory. Examples of flash memory include NOR, AND, Divided bit-line NOR (DINOR), Not AND (NAND), and other flash memories. In at least one embodiment, host 710 can be any electronic device that implements non-volatile memory, such as flash memory 746. Examples of such electronic devices include removable memory devices, such as flash memory cards, universal serial bus ("USB") flash drives, and the like. The electronic devices implement flash memories for a variety of applications, including digital cameras, MP3 music players, handheld computing devices, cellular phones, and other electronic devices requiring removable storage. Examples of flash memory cards include a variety of the following trademarked products Secure Digital™ (compliant with specifications maintained by the SD Card Association of San Ramon, Calif.), MultiMediaCard™ (compliant with specifications maintained by the MultiMediaCard Association ("MMCA") of Palo Alto, Calif.), MiniSD™ (as manufactured by SanDisk, Inc.), MicroSD™ (as manufactured by SanDisk, Inc.), CompactFlash™ (compliant with specifications maintained by the CompactFlash Association ("CFA") of Palo Alto, Calif.), SmartMedia™ (compliant with specifications maintained by the Solid State Floppy Disk Card ("SSFDC") Forum of Yokohama, Japan), xD-Picture Card™ (compliant with specifications maintained by the xD-Picture Card Licensing Office of Tokyo, Japan), Memory Stick™ (compliant with specifications maintained by the Solid State Floppy Disk Card ("SSFDC") Forum of Yokohama, Japan), TransFlash™ (as manufactured by SanDisk, Inc.), and other flash memory cards. In at least one instance, removable memory card 730 can be implemented as a non-removable memory device.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. Further, although the above description of the embodiments related to a flash memory, the discussion is applicable to all types of non-volatile memory and non-volatile memory-based products requiring software (i.e., firmware) upgrades.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments may be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

The invention claimed is:

1. A method for facilitating the functionality of non-volatile memory system during firmware upgrades, the method comprising:
   designating a first copy of firmware instructions for accessing and a second copy of said firmware instructions for upgrading, wherein the first and second copy of firmware are stored in first and second non-volatile storage locations of the non-volatile memory system and the first and second copy of firmware each include instructions for rebooting the non-volatile memory system and for interfacing between a host device and a memory space of the non-volatile memory system;
   accessing from the first copy one or more firmware instructions for interfacing between the host device and the memory space; and
   upgrading at least a portion of said second copy's instructions for interfacing between the host device and the memory space with at least a portion of new firmware instructions for interfacing between the host device and the memory space,
   wherein upgrading said portion of said second copy is substantially coincident to accessing said one or more firmware instructions from said first copy.

2. The method of claim 1 wherein designating said second copy of firmware instructions for upgrading is a function of a state of said firmware upgrade.

3. The method of claim 1 wherein designating said second copy of firmware instructions for upgrading comprises:
   determining a state of a firmware upgrade for the non-volatile memory system; and
   maintaining an identifier representing said state through disruptive events affecting said firmware upgrade, said identifier specifying which one of said first copy or said second copy is upgraded in one or more states of the firmware upgrade.

4. The method of claim 1 wherein upgrading said portion of said second copy comprises:
   merging at least another portion of said first or second copy with said portion of said new firmware instructions to form at least a portion of an upgraded copy.

5. The method of claim 1 wherein upgrading said portion of said second copy further comprises:
   copying one other portion of said firmware instructions from said first copy; and
   writing said one other portion to said second copy.

6. The method of claim 1 further comprising:
   performing discrete upgrade operations through a number of states in said firmware upgrade;
   detecting a state in which a disruptive event halted a previous firmware upgrade; and
   resuming said previous firmware upgrade as said firmware upgrade, omitting at least one of said states implemented in said previous firmware upgrade.

7. The method of claim 1 further comprises:
   detecting said firmware upgrade had been aborted; and
   restoring said second copy of said firmware instructions,
   wherein restoring said second copy of said firmware instructions is substantially coincident to accessing said one or more firmware instructions.

8. A method of resiliently upgrading firmware for a removable memory card, said method comprising:
   modifying system files comprising firmware instructions in one copy of either a primary copy or said secondary copy to form an upgraded copy, wherein the modified firmware instructions are arranged to provide interfacing between a host device and a memory space of the removable memory card; and
   executing firmware instructions from the other copy of either said primary copy or said secondary copy, wherein the executed firmware instructions are also arranged to provide interfacing between a host device and a memory space of the removable memory card,
   wherein executing said firmware instructions and modifying said system files occur in a common interval of time.

9. The method of claim 8 further comprising:
   executing initialization instructions to determine which of said one copy is designated for modifying said system files.

10. The method of claim 9 further comprising:
    storing a portion of said initialization instructions as a boot code; and
    executing said boot code to load boot loader code instructions into a memory as another portion of said initialization instructions.

11. The method of claim 8 further comprising:
    executing said firmware instructions from said other copy when a state of system file modification is from a first subset of states; and
    executing modified firmware instructions from said one copy when said state of system file modification is from a second subset of states.

12. The method of claim 11 wherein executing said firmware instructions from said other copy comprises:
    executing said firmware instructions from either said primary copy or said secondary copy during a boot-up mode if said state of system file modification from said first subset is a "normal" state; and
    executing said firmware instructions from said primary copy during said boot-up mode if said state of system file modification from said first subset is an "use old" state, which indicates that said secondary copy is unavailable.

13. The method of claim 11 wherein executing said firmware instructions from said one copy comprises:
    executing said modified firmware instructions from said secondary copy during a boot-up mode when said state of system file modification from said second subset is a "validation" state, which indicates that said secondary copy is used for validating said upgraded copy; and
    executing said modified firmware instructions from said secondary copy during said boot-up mode when said state of system file modification from said second subset is a "use new" state, which indicates that said primary copy is unavailable.

14. The method of claim 11 further comprising:
    executing said firmware instructions from said secondary copy during a boot-up mode when said state of system file modification from said second subset is an "installing new" state, which indicates said system files of said upgraded copy have yet to be validated.

15. The method of claim 8 further comprising:
    executing said firmware instructions from said primary copy during a boot-up mode to restore said firmware instructions in said secondary copy if said upgraded copy is invalid, wherein restoration of said secondary copy occurs substantially in parallel to executing instructions from said primary copy.

16. A method of resiliently upgrading firmware for a removable memory card, said method comprising:
designating a primary copy of firmware instructions for accessing and a secondary copy of said firmware instructions for upgrading;
modifying system files comprising firmware instructions in said secondary copy to form an upgraded copy; and
executing firmware instructions from the primary copy, wherein executing said firmware instructions and modifying said system files occur in a common interval of time;
storing data representing a state of forming said upgraded copy; and
accessing said data representing said state during a boot-up mode to select said one copy for modification and said other copy for execution based on said state, wherein accessing said state further comprises performing a subsequent boot-up mode following a disruptive event to resume forming said upgraded copy at a subsequent state.

17. A computer readable medium for facilitating the functionality of a non-volatile memory system during firmware upgrades, said computer readable medium comprising executable instructions to:
designate a first copy of firmware instructions for accessing and a second copy of said firmware instructions for upgrading, wherein the first and second copy of firmware are stored in first and second non-volatile storage locations of the non-volatile memory system and the first and second copy of firmware each include instructions for rebooting the non-volatile memory system and for interfacing between a host device and a memory space of the non-volatile memory system;
access from the first copy one or more firmware instructions for interfacing between the host device and the memory space; and
upgrade at least a portion of said second copy's instructions for interfacing between the host device and the memory space with at least a portion of new firmware instructions for interfacing between the host device and the memory space,
wherein said executable instructions to upgrade said portion of said second copy are configured to execute substantially coincident to said executable instructions to access said one or more firmware instructions from said first copy.

18. The computer readable medium of claim 17 wherein said executable instructions to designate said second copy of firmware for upgrading comprise executable instructions to:
determine a state of a firmware upgrade for the non-volatile memory system; and
maintain an identifier representing said state through disruptive events affecting said firmware upgrade, said identifier specifying which one of said first copy or said second copy is upgraded in one or more states of the firmware upgrade.

19. The computer readable medium of claim 17 wherein said executable instructions to upgrade said portion of said second copy comprise executable instructions to:
merge at least another portion of said first or second copy with said portion of said new firmware instructions to form at least a portion of an upgraded copy.

20. The computer readable medium of claim 17 further comprising executable instructions to:
perform discrete upgrade operations through a number of states in said firmware upgrade;
detect a state in which a disruptive event halted a previous firmware upgrade; and
resume said previous firmware upgrade as said firmware upgrade, omitting at least one of said states implemented in said previous firmware upgrade.

21. The computer readable medium of claim 17 further comprising executable instructions to:
detect said firmware upgrade had been aborted; and
restore said second copy of said firmware instructions,
wherein said executable instructions to restore said second copy of said firmware instructions are configured to execute substantially coincident to said executable instructions to access said one or more firmware instructions.

22. A multi-mode memory controller for selectably upgrading firmware through a plurality of selectable states, said multi-mode memory controller comprising:
a firmware selector configured to select a first copy of firmware instructions for accessing in a functional mode and a second copy of said firmware instructions for upgrading in an upgrade mode, wherein the first and second copy of firmware instructions each include instructions for rebooting a non-volatile memory system and for interfacing between a host device and a memory space of the non-volatile memory system; and
an upgrade controller coupled to said firmware selector, said upgrade controller being configured to:
access from the first copy said first copy in said functional mode one or more firmware instructions for interfacing between the host device and the memory space, and
replace at least a portion of said second copy's instructions for interfacing between the host device and the memory space with at least a portion of an upgrade firmware instructions for interfacing between the host device and the memory space in said upgrade mode,
wherein said upgrade mode is substantially coincident to said functional mode.

23. The multi-mode memory controller of claim 22 wherein said upgrade controller is further configured to merge at least another portion of said first or second copy with said portion of said upgrade firmware instructions to form at least a portion of an upgraded copy.

24. The multi-mode memory controller of claim 23 wherein said upgrade controller is further configured to:
progress through a number of states in said upgrade mode, and to
complete another number of said states after a disruptive event halts said upgrade mode.

25. The multi-mode memory controller of claim 22 further comprises:
a multiple-path recovery module configured to restore said second copy of said firmware instructions during a recovery mode after said upgrade mode is aborted, said multiple-path recovery module being configured to implement one of a number of paths to recovery as a function of a state,
wherein said recovery mode is substantially coincident to said functional mode.

26. A removable memory card including firmware upgradeable in phases, said removable memory card comprising:
a flash memory including memory locations being configured to store:
a primary copy of firmware, and a secondary copy of said firmware, wherein the first and second copy of firmware each include instructions for rebooting the removable memory card and for interfacing between a host device and the flash memory; and a memory controller coupled to said flash memory being configured to:
modify system files comprising firmware instructions in one copy of either said primary copy or said secondary copy to form an upgraded copy, wherein the modified firmware instructions are arranged to provide interfacing between a host device and the flash memory, and to
execute firmware instructions from the other copy of either said primary copy or said secondary copy, wherein the executed firmware instructions are also arranged to provide interfacing between a host device and the flash memory,
wherein execution of said firmware instructions and modification of said system files occur in a common interval of time.

27. The removable memory card of claim 26 wherein said memory controller includes:
a memory configured to store initialization instructions; and
a processor configured to execute said initialization instructions to determine which of said one copy is designated for modifying said system files.

28. The removable memory card of claim 27 wherein said removable memory card further comprises:
a non-volatile memory configured to store a portion of said initialization instructions as a boot code,
wherein said processor is further configured to execute the boot code to load boot loader instructions into said memory as another portion of said initialization instructions,
wherein said non-volatile memory includes an error log configured to store state data representing a state of forming said upgraded copy,
said processor further configured to access said state during a boot-up mode and to select said one copy for modification and said other copy for execution based on said state.

29. The removable memory card of claim 26 wherein said memory controller is configured to:
execute said firmware instructions from said other copy when a state of system file modification is from a first subset of states; and
execute modified firmware instructions from said one copy when said state of system file modification is from a second subset of states.

30. The removable memory card of claim 29 wherein said memory controller is further configured to:
execute said firmware instructions from either said primary copy or said secondary copy during a boot-up mode if said state of system file modification from said first subset is a "normal" state; and
execute said firmware instructions from said primary copy during said boot-up mode if said state of system file modification from said first subset is an "use old" state, which indicates that said secondary copy is unavailable.

31. The removable memory card of claim 29 wherein said memory controller is further configured to:
execute said modified firmware instructions from said secondary copy during a boot-up mode when said state of system file modification from said second subset is a "validation" state, which indicates that said secondary copy is used for validating said upgraded copy; and
execute said modified firmware instructions from said secondary copy during said boot-up mode when said state of system file modification from said second subset is a "use new" state, which indicates that said primary copy is unavailable.

32. The removable memory card of claim 29 wherein said memory controller is further configured to:
execute said firmware instructions from said secondary copy during a boot-up mode when said state of system file modification from said second subset is an "installing new" state, which indicates said system files in said upgraded copy have yet to be validated.

33. The removable memory card of claim 26 wherein said memory controller is further configured to:
execute said firmware instructions from said primary copy during a boot-up mode to restore said firmware instructions in said secondary copy if said upgraded copy is invalid,
wherein restoration of said secondary copy occurs substantially in parallel to executing instructions from said primary copy during a functional mode.

34. A removable memory card including firmware upgradeable in phases, said removable memory card comprising:
a flash memory including memory locations being configured to store:
a primary copy of firmware for accessing,
a secondary copy of said firmware for upgrading; and
an error log configured to maintain state data representing a state of system file modification; and
a memory controller coupled to said flash memory being configured to:
modify system files comprising firmware instructions in said secondary copy to form an upgraded copy;
execute firmware instructions from the primary copy, wherein execution of said firmware instructions and modification of said system files occur in a common interval of time; and
access said state data during a boot-up mode following a disruptive event to resume forming said upgraded copy at a subsequent state.

* * * * *